(12) United States Patent
Schofield

(10) Patent No.: US 9,254,819 B2
(45) Date of Patent: Feb. 9, 2016

(54) FREIGHT PROTECTION SYSTEM

(76) Inventor: Barry James Schofield, Crawley Sussex (GB)

( * ) Notice: Subject to any disclaimer, the term of this patent is extended or adjusted under 35 U.S.C. 154(b) by 978 days.

(21) Appl. No.: 12/595,779

(22) PCT Filed: Mar. 12, 2008

(86) PCT No.: PCT/GB2008/050173
§ 371 (c)(1),
(2), (4) Date: Mar. 11, 2010

(87) PCT Pub. No.: WO2008/110843
PCT Pub. Date: Sep. 18, 2008

(65) Prior Publication Data
US 2010/0182138 A1 Jul. 22, 2010

(30) Foreign Application Priority Data

Mar. 12, 2007 (GB) .................................. 0704700.4
Jun. 12, 2007 (GB) .................................. 0711266.7

(51) Int. Cl.
*B60R 25/10* (2013.01)
(52) U.S. Cl.
CPC ................................ *B60R 25/1004* (2013.01)
(58) Field of Classification Search
USPC .................. 340/426.24, 426.28, 426.29, 546, 340/545.2, 545.6
See application file for complete search history.

(56) References Cited

U.S. PATENT DOCUMENTS 3,896,427 A * 7/1975 Campman ..................... 340/540
2001/0030605 A1* 10/2001 Novotny .................... 340/545.1

FOREIGN PATENT DOCUMENTS

| DE | 4203865 | 3/1993 |
|----|---------|--------|
| FR | 2706830 | 12/1994 |
| WO | 2005/048206 | 5/2005 |

OTHER PUBLICATIONS

International Search Report for corresponding application No. PCT/GB2008/050173 completed Jun. 10, 2008.

* cited by examiner

*Primary Examiner* — Tai T Nguyen
*Assistant Examiner* — Ojiako Mwugo
(74) *Attorney, Agent, or Firm* — Roy A. Ekstrand

(57) ABSTRACT

An alarm unit (1) for a vehicle comprises four magnet housings (4), each having a vehicle-engaging surface and four magnets (5) received within respective magnet housings (4) and arranged for movement relative to the vehicle-engaging surface of the housing. A spring material (11) biases the magnets (5) into a position in which they are spaced from the vehicle-engaging surface of the housing (4). An electrical sensor (10) detects movement of the magnets (5) relative to the vehicle-engaging surface of the magnet housing.

12 Claims, 3 Drawing Sheets

FREIGHT PROTECTION SYSTEM

This application is a national phase of International Application No. PCT/GB2008/050173 filed Mar. 12, 2008 and published in the English language.

FIELD OF THE INVENTION

This invention relates to freight protection system and device.

BACKGROUND TO THE INVENTION

The freight industry has for years suffered loss in many forms. Some of which occurs while the vehicle carrying freight is at rest, and the driver is away from the vehicle taking a break etc. The security of the rear doors on containers being carried that contains the freight are often forced open and the security easily breached.

FR 2706830 discloses an anti-theft device for transport containers consisting of a removable casing which covers the locks or padlocks locking shut the doors of the container. This casing, connected to a central alarm, is held in place using a metal support welded or bolted onto the lock or the padlock and onto which it is applied using permanent magnets so that one or more micro-contacts are actuated as long as the casing remains in place. Withdrawing the casing actuates the alarm by releasing the micro-contacts.

This application discloses a freight protection system that has been designed to warn of intrusion. Unlike other security devices that are already in production, embodiments of this system are self-arming and completely 'stand alone' from any electrical systems on the vehicles.

SUMMARY OF THE INVENTION

Accordingly, this invention provides an alarm unit as defined in claim 1. Advantageous features of embodiments of the invention are set out in the dependent claims.

BRIEF DESCRIPTION OF THE DRAWINGS

An embodiment of the invention will now be described by way of example only and with reference to the accompanying drawings, in which.

DETAILED DESCRIPTION OF AN EMBODIMENT

Figure 1:
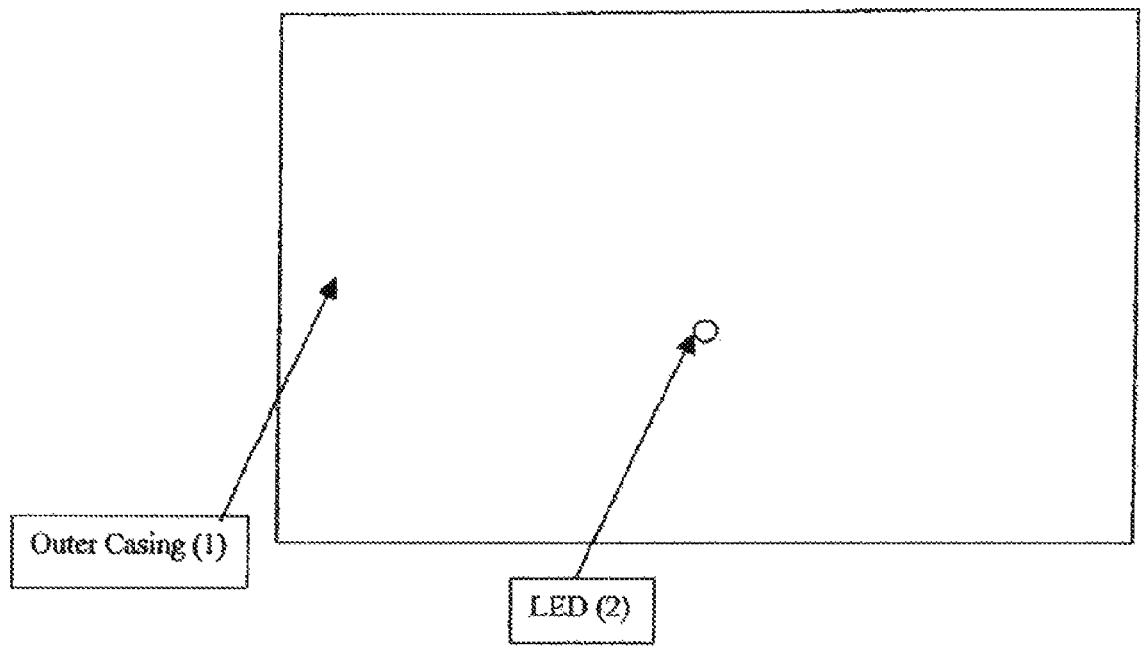
FIG. 1 is a schematic front view of an alarm unit according to an embodiment of the invention.

FIG. 1 is a schematic front view of an alarm unit according to an embodiment of the invention. The figure shows the front of the outer casing of the unit (1) that has incorporated within it a L.E.D. (2).

Figure 2:
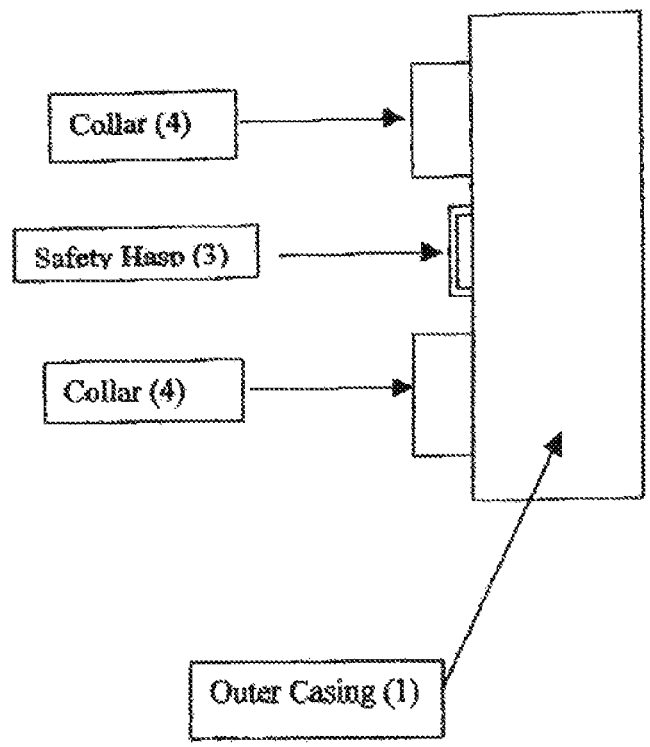
FIG. 2 is a schematic side view of the alarm unit of FIG. 1.

FIG. 2 is a schematic side view of the alarm unit of FIG. 1, which shows the side of the unit (1) and a safety hasp (3) and collars (4) that contain magnets.

Figure 3:
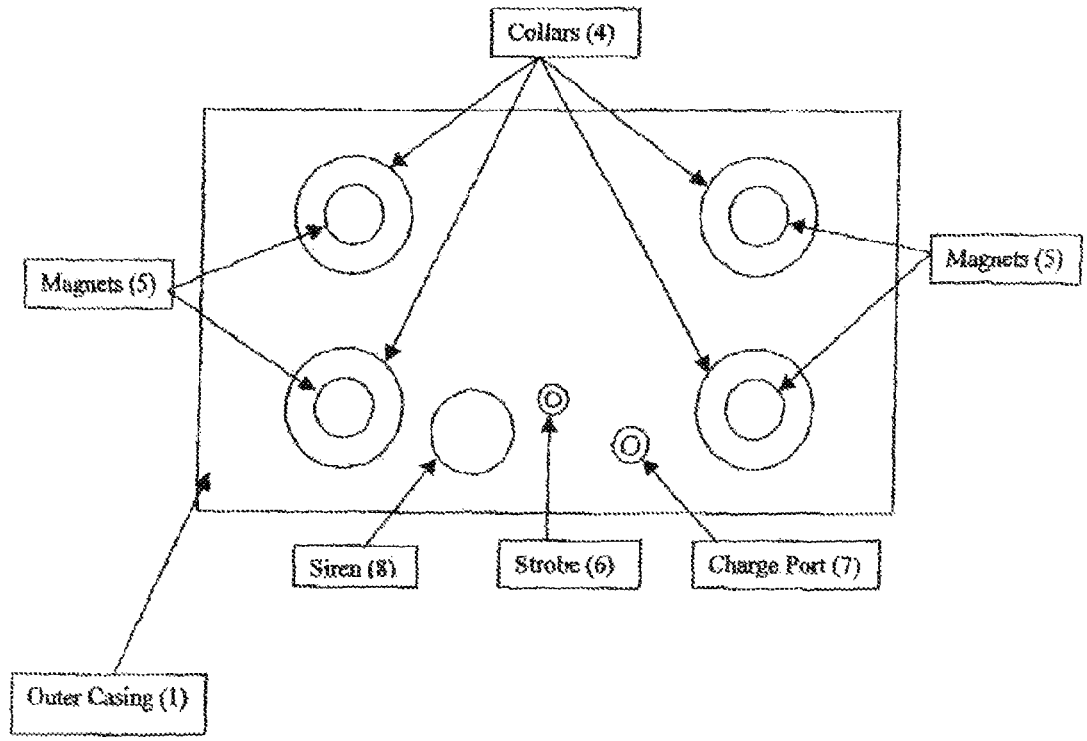
FIG. 3 is a schematic rear view of the alarm unit of FIG. 1.

FIG. 3 is a schematic rear view of the alarm unit of FIG. 1, which shows the rear of the unit (1), the four collars (4), the four magnets (5), a strobe light (6), a charging port (7), and a siren (8).

Figure 4:
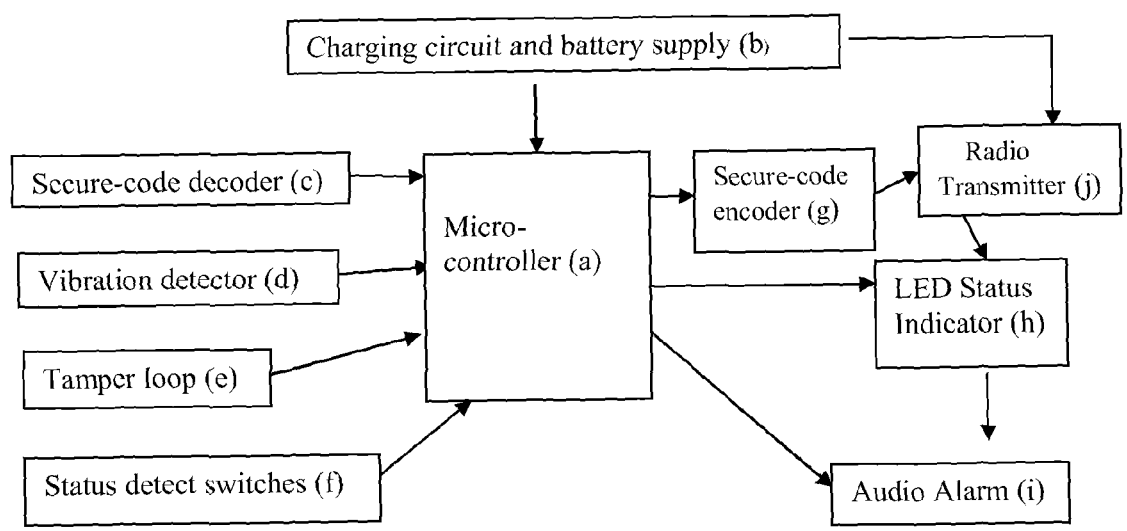
FIG. 4 is a block diagram of a freight protection system according to an embodiment of the invention.

FIG. 4 is a block diagram of a freight protection system according to an embodiment of the invention, which shows the electrical wiring diagram of the unit. A micro-controller unit (a) receives input from the charging circuit and battery cells (b), the secure-coded decoder (c), the vibration detector (d), the tamper loop (e), and the status detect sensors (switches) (f). The micro-controller unit (a) then assesses all the information and sends out signals to the secure-coded encoder (g), the LED status indicator (h), the audio alarm (i), and the radio transmitter (j).

The alarm is primarily intended to give a remote indication of attempted interference with the doors of containers or metal doors. The system is designed for minimal user attention and only requires the user to unset the device to remove, automatic arming is achieved on attachment and correct attachment is confirmed visually (LED indicator) and audibly (alarm blips) and flashing high intensity light.

The alarm is attached across the door seam between the locking bars. Once all four magnets are engaged the unit will automatically arm. The LED indicator flashing red five times followed by three short blips of the audio alarm indicates the armed state.

Once set, the LED indicator will flash red briefly every two seconds.

If triggered, the alarm sends a coded radio signal followed by fifteen seconds of the audio alarm sound; this is repeated four times. New software could then send a radio signal every minute followed by two seconds of audio alarm until the unit is reset with a fob. The advantage of this is that if the unit is removed and thrown aside it can still send radio transmissions and also be retrieved by hearing the alarm periodically.

The unit is removed by using a small unit specifically coded to the alarm.

To remove the alarm, the unit is deactivated using a coded electronic key. The indicator LED will flash green slowly five times during which time the alarm can be removed (pulled) off the doors. When removed during the flashing green period it will enter the inactive state.

Any activation sends a coded signal to a receiver. This is carried on the user's person and will give a loud audible tone should the alarm activate.

Mechanical Design

Figure 5:
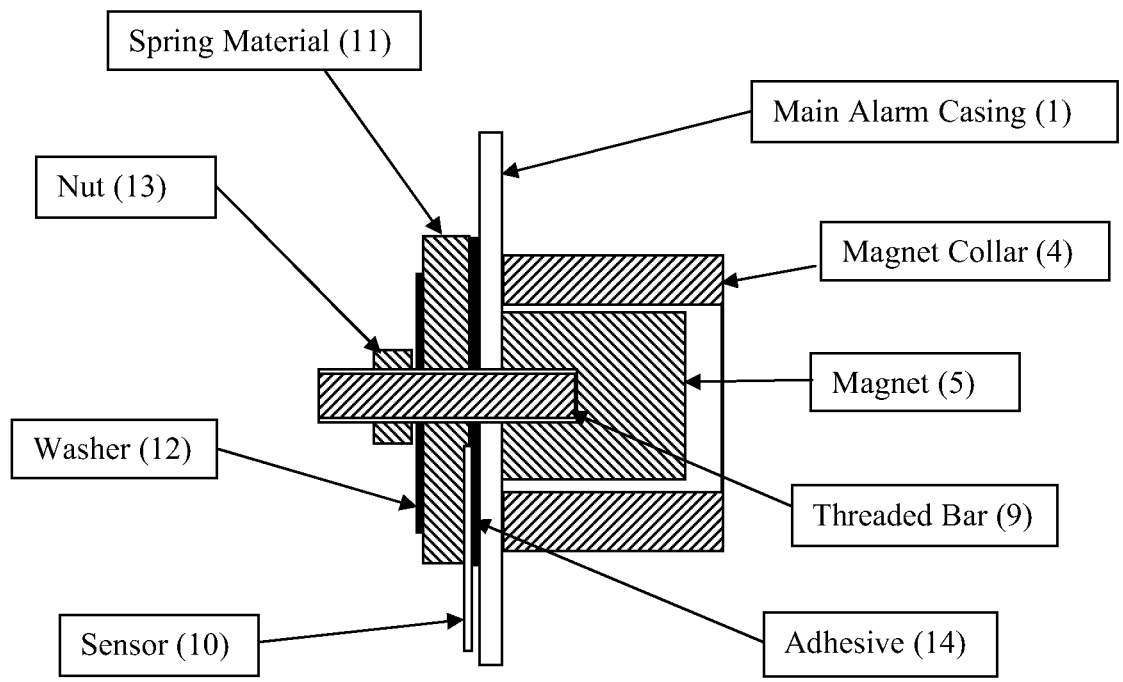
FIG. 5 is a sectional view of the mechanical design of magnetic attachment and sensor according to an embodiment of the invention.

FIG. 5 is a sectional view of the mechanical design of magnetic attachment and sensor according to an embodiment of the invention. This is a diagram of the specific unique self-arming design using a magnet house in an outer casing with the calibration units inside the main case.

The main feature of the mechanical design is the method of magnetic attachment. This has a three state function;

1) The magnets form the main part of the attachment system to the magnetic surface and provide sufficient force to hold the unit in place securely under stationary conditions.

2) When the alarm is attached to a magnetic surface, the magnets in each of the four housings are pulled forward to the limit of the housing. Switch sensors detect this action and if all four magnets are at the limit of the housing the system will detect this and enable the alarm.

3) The third stage is to detect the unit being pulled away from the magnetic surface. This is achieved by detecting when the magnets are pulled beyond the limit of their housings by a pre-set amount.

The actual design of the housings and travel limiting are shown in FIG. 5. Springs or spring material are used to retract the magnets and the pressure these exert is sufficient to hold the unit firmly but not excessively so that the magnets are stopped from reaching the magnetic surface by a distance of approximately 3 mm.

The self-arming feature is a magnet (5) housed in a protective collar (4). A threaded bar (9) is screwed into the back of the magnet (5) through the casing (1). Inside the casing (1) sits an electrical sensor (10) that is secured to the casing (1) by an adhesive (14). This is covered by a spring material (11) that is held in place by a metal washer (12). A nut (13) is then screwed on to the threaded bar (9) and is adjusted to calibrate the whole unit to give precise readings of how much force is placed on the magnet when it is in the process of being removed from its location.

This adjustment by twisting the nut (13) calibrates each of the four sensors thereby giving each sensor the ability individually to sense movement of the magnets. At a predetermined calibration any of the four sensors will activate the alarm unit.

The electrical sensor may comprise a piezoelectric material.

Example of Unit in Operation

When the unit (1) is required, it is placed over the seal between two opening doors. The unit (1) automatically attaches itself to the doors by way of magnets housed in collars (4) on the rear. The unit (1) then automatically arms itself and a flashing LED (2) indicates that arming has taken place. A tone sounds (8) confirming also that the system is now armed.

Should the unit (1) be attacked, the alarm will sound (8) and the LED (2) will flash rapidly, along with the strobe light (6). In the meantime an electrical coded signal is being sent to a receiver that warns of the attack.

In summary, an alarm unit 1 for a vehicle comprises four magnet housings 4, each having a vehicle-engaging surface and four magnets 5 received within respective magnet housings 4 and arranged for movement relative to the vehicle-engaging surface of the housing. A spring material 11 biases the magnets 5 into a position in which they are spaced from the vehicle-engaging surface of the housing 4. An electrical sensor 10 detects movement of the magnets 5 relative to the vehicle-engaging surface of the magnet housing.

Embodiments of the invention provide:

1. A self arming security system that can be easily attached to twin opening doors and indicates via an alarm and flashing LED indicators if attacked, at the same time sending a coded signal to a receiver warning of such attack.

2. The special features of this system are the design of the self-arming contacts within the casing and the ease with which it can be used. It is totally self-sufficient for electrical energy by way of a rechargeable battery pack and can only be removed from its location by the use of a secure coded device which will disarm the unit.

3. The design of the magnetic sensors and the material used has enabled the calibration of the four sensors to be accurate making activation when any of the four sensors are attacked very reliable.

Although the invention has been described with reference to vehicle security, the alarm unit may be used in other applications, for example securing the doors of refrigerators.

The invention claimed is:

1. An alarm unit for a vehicle having at least one magnetic detector, each of said magnetic detectors comprising:

a magnet housing having a vehicle-engaging surface;
a magnet received within said magnet housing;
a bar having a first end engaging said magnet and a second end, said bar
supporting said magnet for movement relative to said vehicle-engaging surface of said magnet housing; a fastener coupled to said bar in a position adjustable attachment to adjustably position said magnet relative to said vehicle-engaging surface; a resilient member coupled to said fastener for biasing said magnet into a position in which it is spaced from said vehicle engaging surface of said magnet housing;
an electrical sensor coupled to said resilient member responsive to movement of said magnet relative to said vehicle engaging surface of said magnet housing; and a signal processing device arranged to detect a variation in said electrical sensors and to trigger an alarm in response to detected movement of said magnet relative to said vehicle engaging surface of said magnet housing.

2. The alarm unit set forth in claim 1, wherein said magnet housing defines an internal cavity that surrounds said magnet.

3. The alarm unit set forth in claim 2, wherein said electrical sensor is formed of a piezoelectric material and wherein said electrical sensor is subjected to a pressure in response to movement of said magnet toward or beyond said vehicle-engaging surface.

4. The alarm unit set forth in claim 3, wherein the resilient member is a spring material.

5. An The alarm unit as claimed set forth in claim 1, further including a pressure washer and wherein said electrical sensor is interposed between said pressure washer and said magnet housing.

6. An The alarm unit as claimed set forth in claim 5, wherein said bar includes threads and wherein said first end is threaded to said magnet and wherein said fastener includes a threaded nut against said pressure washer whereby the sensitivity of the alarm unit may be adjusted by rotating said nut upon said bar.

7. The alarm unit set forth in claim 6, further including a supporting casing and at least a second magnetic detector, said magnetic detectors being supported by said casing.

8. The alarm unit set forth in claim 1 further including a plurality of magnetic detectors, each associated with a respective electrical sensor and a support casing supporting said magnetic detectors in a spaces-apart relationship.

9. An alarm unit for use in combination with a vehicle having a pair of opening doors which each define door surfaces and which meet when closed to form a door seam, an alarm unit comprising:

a support housing;
a plurality of magnetic detectors supported upon said support housing in a spaced-apart relationship each of said magnetic detectors including:
a magnet housing having a vehicle-engaging surface, a magnet adjustably supported relative to said vehicle-engaging surface, means for adjusting the position of said magnet relative to said vehicle-engaging surface and a sensor responsive to movement of said magnet relative to said vehicle-engaging surface; and alarm means responsive to said sensors in said magnetic detectors having a signal processing device arranged to detect a movement of said magnet relative to said vehicle engaging surface of said magnet housing and to trigger an alarm in response to detected movement of said magnet relative to said vehicle engaging surface of said magnet housing, said alarm unit being magnetically attached to a vehicle by said magnets such that said support housing spans the vehicle door seam and at least one of said magnetic detectors is on one vehicle door and the other is on the remaining vehicle door.

10. The alarm unit set forth in claim 9 wherein said magnetic detectors each include a resilient member coupled to said magnet positioner for biasing said magnet into a position in which it is spaced from said vehicle-engaging surface of said magnet housing.

11. The alarm unit set forth in claim 10 wherein said magnet housings each defines an internal cavity that surrounds said magnet.

12. The alarm unit set forth in claim 11 wherein each of said electrical sensors is formed of a piezoelectric material and wherein each of said electrical sensors is subjected to a pressure in response to movement of said magnet toward or beyond said vehicle-engaging surface.

\* \* \* \* \*